Sept. 17, 1963             S. DUFF             3,104,019

APPARATUS FOR GARAGING OR STORING MOTOR VEHICLES

Filed April 11, 1960             9 Sheets-Sheet 1

Inventor

SAMUEL DUFF

By *Irwin S. Thompson*

Attorney

Sept. 17, 1963             S. DUFF             3,104,019

APPARATUS FOR GARAGING OR STORING MOTOR VEHICLES

Filed April 11, 1960             9 Sheets-Sheet 2

*Inventor*
SAMUEL DUFF
By Irwin S. Thompson
*Attorney*

Sept. 17, 1963 S. DUFF 3,104,019
APPARATUS FOR GARAGING OR STORING MOTOR VEHICLES
Filed April 11, 1960 9 Sheets-Sheet 5

Inventor
SAMUEL DUFF
By Irvin S. Thompson
Attorney

Sept. 17, 1963 S. DUFF 3,104,019
APPARATUS FOR GARAGING OR STORING MOTOR VEHICLES
Filed April 11, 1960 9 Sheets-Sheet 6

Inventor
SAMUEL DUFF
By Irwin S. Thompson
Attorney

Sept. 17, 1963      S. DUFF      3,104,019
APPARATUS FOR GARAGING OR STORING MOTOR VEHICLES
Filed April 11, 1960      9 Sheets-Sheet 8

Inventor
SAMUEL DUFF
By Irwin S. Thompson
Attorney

Samuel Duff
INVENTOR

BY *Irwin J. Thompson*

ATTORNEY

United States Patent Office 3,104,019
Patented Sept. 17, 1963

3,104,019
APPARATUS FOR GARAGING OR STORING MOTOR VEHICLES
Samuel Duff, Glen-Airley, Killaghy, Donaghadee, County Down, Northern Ireland
Filed Apr. 11, 1960, Ser. No. 21,482
7 Claims. (Cl. 214—16.1)

This invention relates to a multi-storey garage.

It is an object of the present invention to provide a multi-storey garage which is economic to build and operate, is efficient and reliable in operation, is of comparatively simple construction and has a high speed of turnover of motor vehicles.

The present invention is a multi-storey garage comprising a loading and unloading zone including a series of supports each adapted to receive and carry a motor vehicle, a series of vertically-spaced garaging floors, and means for conveying each support and its motor vehicle from said zone to one of the garaging floors, and vice versa.

Preferably each garaging floor is subdivided into two laterally-spaced series of side-by-side storing berths and a central conveying passage.

Preferably also, the garage is of substantially skeleton construction, each storing berth having no floor and the necessary floor being provided by the support introduced into the berth and maintained removably in position therein.

Preferably also, there is provided at each end a vertical conveyor in communication with the central conveying passage, one conveyor being for raising supports and their motor vehicles, while the other is for lowering the supports and their motor vehicles.

Preferably also, each vertical conveyor comprises a pair of laterally-spaced endless members mounting aligned support-engaging elements. Each vertical conveyor may be moved stepwise.

An embodiment of the present invention will now be described, by way of example, with reference to the accompanying diagrammatic drawings, in which:

FIGS. 5 to 7 are respectively an underside plan view, a plan view and a side elevation of a support;

Referring to the drawings, the multi-storey garage consists of a ground floor level 15 and a number of floors 16, say ten, above ground level. The garage is of substantially skeleton construction and preferably has an outer shell or covering (not shown).

Each floor 16 is a storing or garaging floor and has, at one end, an inlet 17 and, at its other end, an outlet 18. Each storing floor 16 is subdivided transversely into two laterally spaced series of side-by-side storing berths 19 having located therebetween a central conveying passage 20. Each storing berth has a removable floor 21 which serves as a transportable support for a motor vehicle.

The ground floor 15 serves as a loading and unloading zone and has an outlet 22 disposed below the garaging floor inlets 17 and an inlet 23 disposed below the garaging floor outlets 18. The ground floor 15 is also subdivided transversely into two laterally-spaced series of collecting and depositing berths 24 having located therebetween a central conveying passage 25.

A vertical conveyor 26 is arranged at that end of the garage at which the storing floor outlets 18 are disposed and is in communication with the central conveying passages 20 and 25. The vertical conveyor 26 serves to transfer the supports 21 with or without a motor vehicle 27 from the storing floors 16 to the ground floor 15. The vertical conveyor 26 is of simple but robust construction and consists of two laterally-spaced endless members or sets of endless members 28 passing around driven sprockets or drums 29 and carrying aligned support-engaging elements 30 adapted to engage under a support 21 with or without a motor vehicle 27 and transport it downwardly between the laterally-spaced endless members 28.

Figure 1:
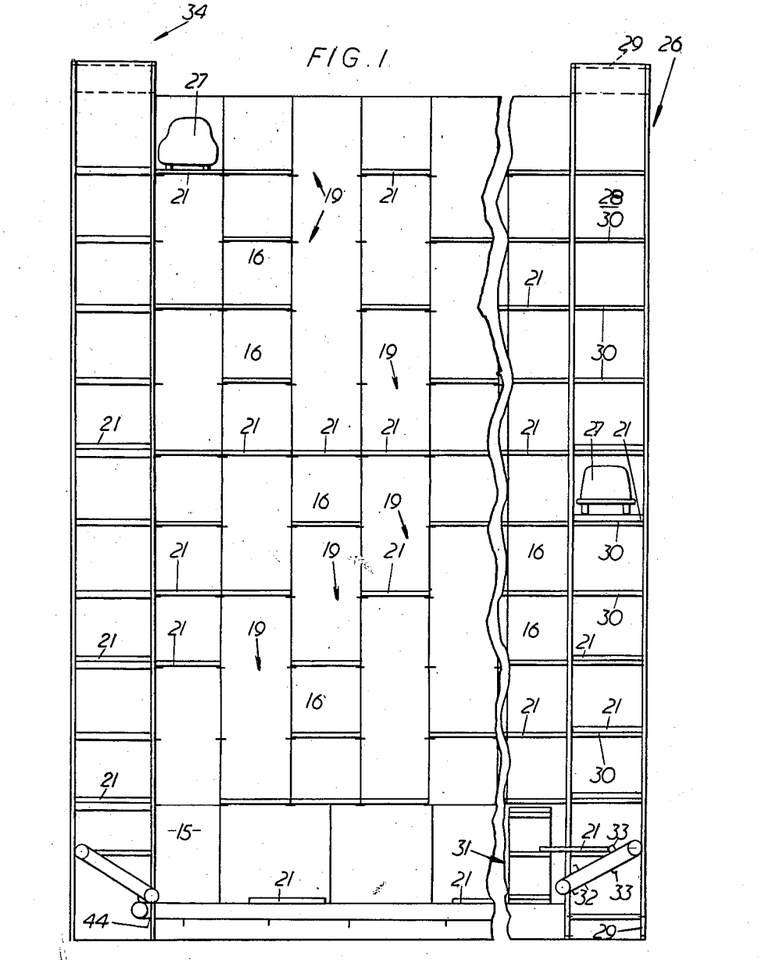
FIG. 1 is a fragmentary side elevation of a multi-storey garage.
Figure 2:
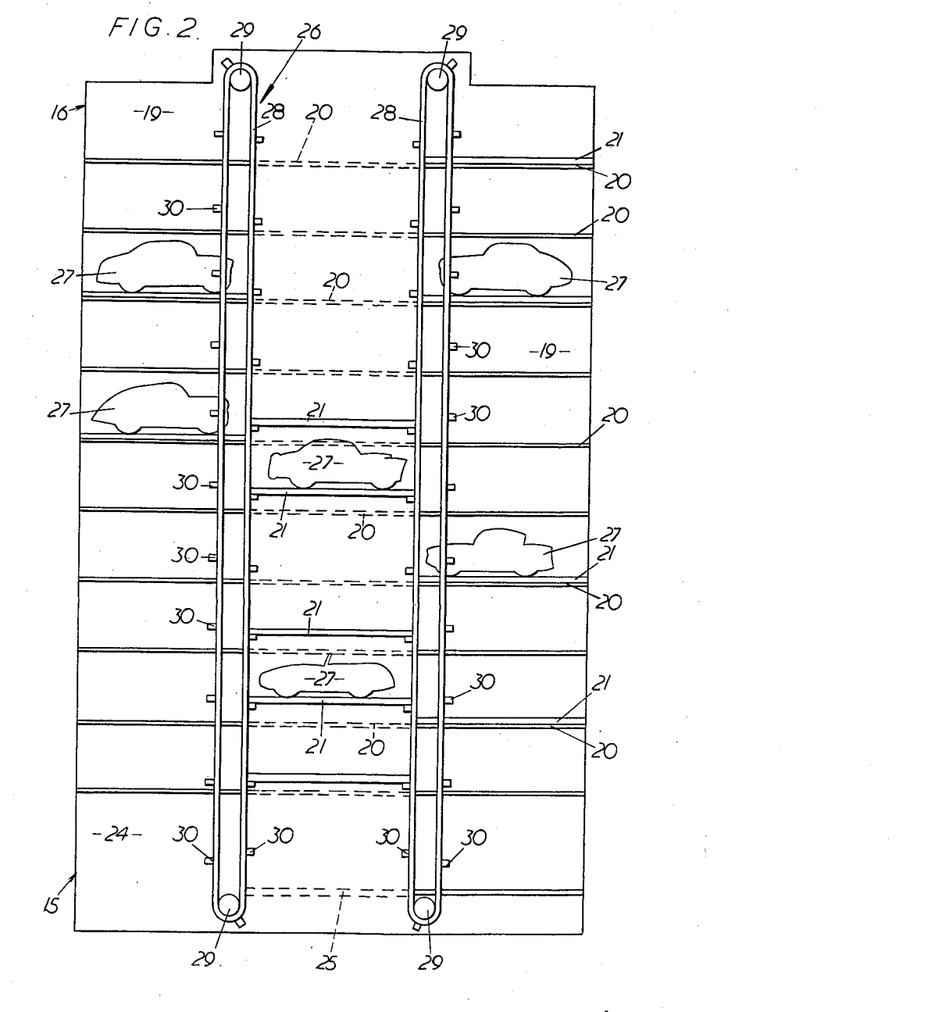
FIG. 2 is an end elevation of the multi-storey garage.
Figure 3:
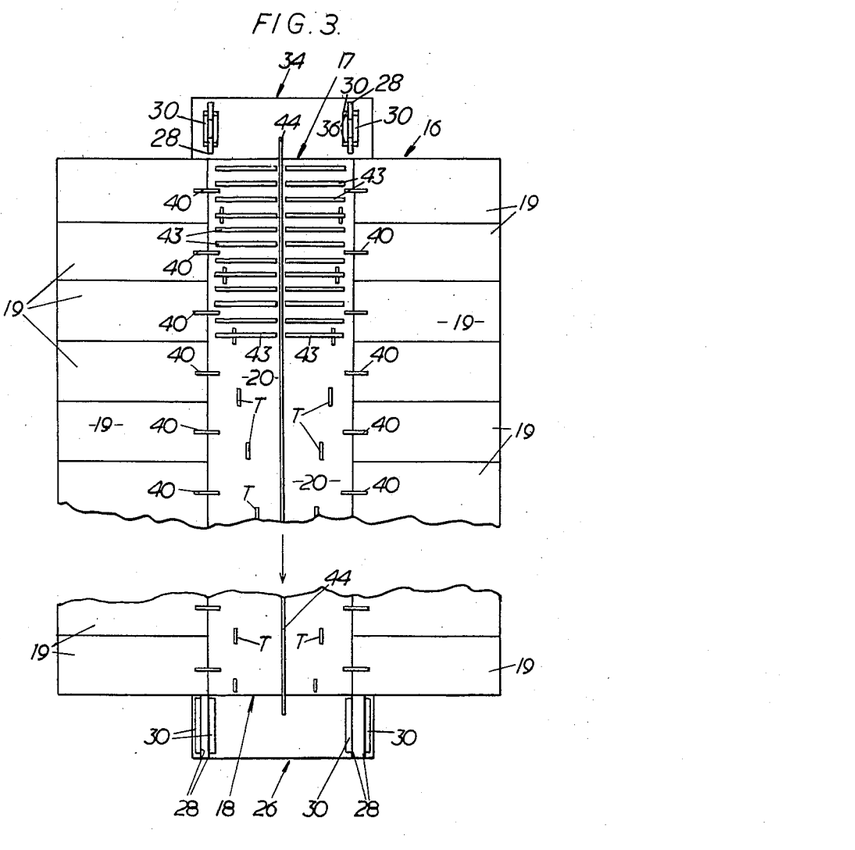
FIG. 3 is a fragmentary plan view of an upper storing level.

A transfer mechanism is provided adjacent ground floor level 15 to transfer each support 21 from the vertical conveyor 26 to the central conveying passage 25. The transfer mechanism (see FIG. 1) comprises a short vertical conveyor 31 similar to the conveyor 26 and is synchronized and in timed relationship therewith and located between the conveyor 26 and passage 25, and an endless chain 32 or other member inclined downwardly from the conveyor 26 to the passage 25 and mounting support-engaging projections 33 which are moved downwardly and inwardly. The arrangement is such that the support 21 is pushed or pulled by the chain 32 and projections 33 from the conveyor 26 on to the short vertical conveyor 31 which deposits it on the passage 25. The transfer mechanism may be dispensed with and the supports 21 deposited directly on the central conveying passage 25 by the conveyor 26. In this instance, however, sufficient clearance must be provided between downwardly conveyed supports 21 to ensure that there is no contact between a support 21 and, for example, a motor vehicle 27 carried by the support 21 therebelow. This could be effected by arranging the elements 30 a distance of two floors apart instead of one as is preferred.

A vertical conveyor 34 is disposed at the other end of the garage and is also in communication with the central conveying passages 20 and 25. This conveyor 34 serves to transfer the supports 21 carrying motor vehicles from ground floor level 15 to the storing floors 16. This upward conveyor 34 is identical with the downward conveyor 26 and, if desired, there may be a transfer mechanism similar to that disposed between the conveyor 26 and central conveying passage 25 also disposed between said passage and the conveyor 34, the chain 31 and projections 33, in this case, lifting or pulling a support 21 from the passage 25 on to the conveyor 34.

Figure 9:
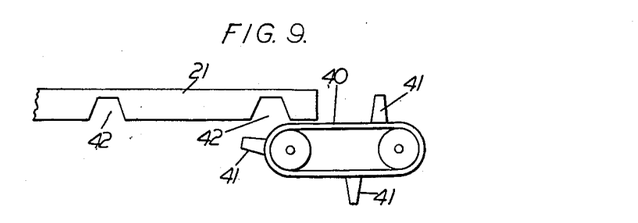
FIGS. 9 to 9c are views of a co-operating support and transfer means.
Figure 9A:
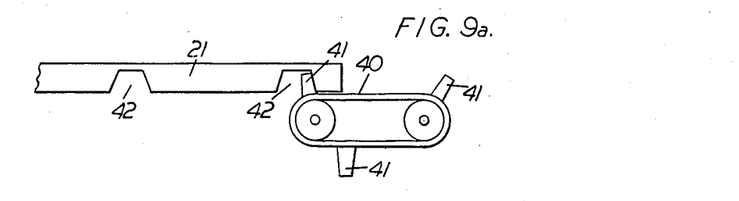
Figure 9B:
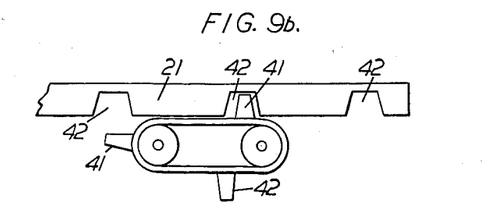
Figure 9C:
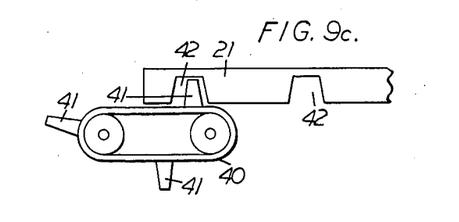

Transfer means (see FIGS. 9 to 9c) is provided between each central conveying passage 20, 25 and each depositing, collecting and storing berth 19, 24. The transfer means comprises a driven endless chain or belt 40 carrying projections 41 which engage in a centrally-disposed line of recesses 42 in the underside of each support 21. The direction of movement of the chains 40 is reversible to permit transfer between conveying passage and berth, or vice versa. It will be seen from FIG. 9c that a projection 41 remains in the last recess 42 when the support 21 is in position in its berth. The chains 40 are preferably rotated by electric motors directly, or via reduction gearing, or by any other suitable means.

Each central passage 20, 25 is provided with rollers 43 to facilitate movement of the supports 21 therealong, and also a central conveying chain 44 similar to chain 40. The chains 44 also assist movement of the supports 21 along the passages 20, 25 and the transfer of supports 21 from passage 25 to the upward conveyor 34 and from passages 20 to the downward conveyor 26. The chain 44 may be one chain extending along the whole length of the conveying passage, or it may consist of a number of sections, each extending over only a part of the conveying passage. The chain 44 or any chain section may be stopped to permit transfer of a support 21 between the conveying passage and a berth 19, 24. During the movement of any support 21 along the conveying passage it is disposed and travels between two projections of the chain 44 or chain sections.

Each support 21 is of a rectangular shape and on its underside has the aforesaid line of recesses 42. The underside is also formed with a recess 45 for engagement with trip means T in each storing floor 16. Two further recesses 46 closable by shutters 47 are provided for engagement with similar trip means T in the ground floor 15. At the end of each support 21 which enters each berth 19 first are provided two laterally spaced recesses 48 closable by shutters 49. These co-act with a signalling system hereinafter described. At the other end of each support 21, that is the end which enters each berth 24 first, is a female part 50 of an actuating means hereinafter referred to.

At one side of the upper surface of the support 21 is a guide channel 51 into which the wheels of a vehicle are driven and having at one end a collapsible forward stopping plate 52 which determines the forward position of the vehicle. The channel 51 also houses retractable elements 53 which are depressed by the vehicle wheel as it passes over them and which spring up behind the wheel to prevent backward movement of the vehicle on the support 21.

Between the stopping plate 52 and the elements 53 is a hinged, upwardly-inclined plate 54. This plate 54 is operatively associated with shutters 47 and 49 by either a linkage system or any other suitable means. When the plate 54 is upwardly inclined one of each pair of shutters 47 and 49 is open, while when the plate 54 is depressed the other of each pair is open. As a result, always one of each pair of shutters 47 and 49 is open.

Figure 8:
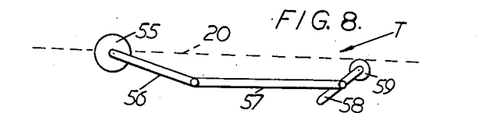
FIGS. 8 to 8d are views of a co-operating support and trip means.
Figure 8A:
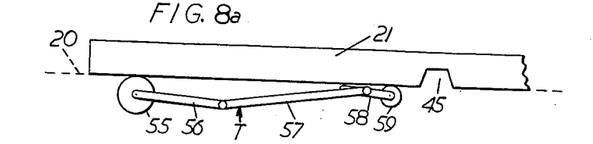
Figure 8B:
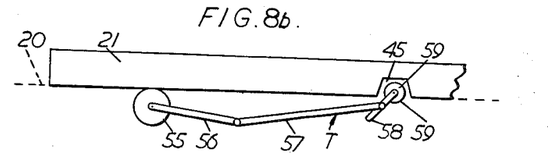
Figure 8D:
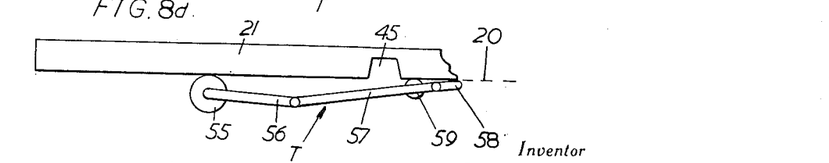
Figure 8E:
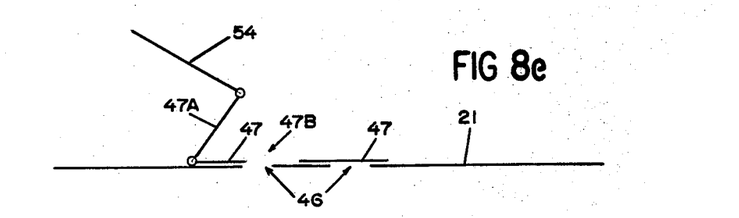
FIGS. 8e to 8h are diagrammatic views of wheel-controlled shutter systems which determine to which side of the ground level of the garage a support will be disposed and which actuate an indicating means.
Figure 8F:
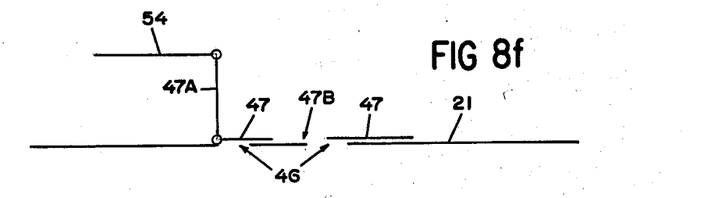

In this connection, reference is made to FIGS. 8e and 8f, and to FIGS. 8g and 8h. FIGS. 8e and 8f show diagrammatically the underside of a support 21 and the recesses 46 closable by a shutter 47 which is connected by a link 47A to the plate 54. The shutter 47 is provided with an opening 47B. In FIG. 8e, the opening 47B registers with the front recess 46 and so the rear recess 46 is closed. In this condition the support 21 is not carrying a vehicle and will be disposed at one side of ground level 15 as hereinafter described. In FIG. 8f, the plate 54 is horizontal indicating the vehicle is being carried by the support 21 and the vehicle wheel (not shown) is depressing the plate 54 and, in this instance, front recess 46 is closed and rear recess 46 is open so that the support will be disposed at the other side of ground level 15.

Figure 8G:
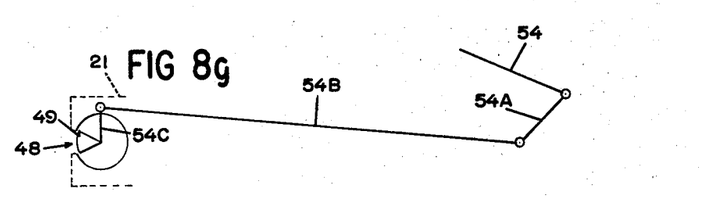
Figure 8H:
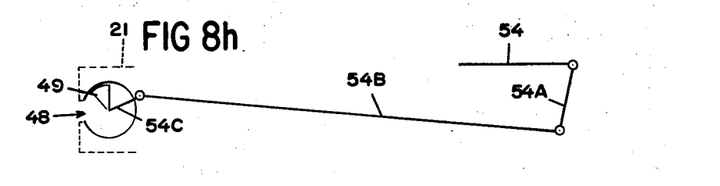

Referring now to FIGS. 8g and 8h, each recess 48 is closable by a rotatable arcuate shutter 49 connected to the plate 54 by links 54A, 54B and 54C. The shutters 49 are connected by a transverse connecting rod (not shown) and are so arranged that when one is in its recess-closing position the other is in its recess-open position. Movement of the plate 54 downwardly by a vehicle wheel closes the open recess 48 and opens the closed recess 48 for the purpose hereinafter described. It is to be understood that although the plate 54 is shown separately connected to the shutter 47 (FIGS. 8e and 8f) and to the shutter 49 (FIGS. 8g and 8h), said plate 54 is, in fact, connected to both shutters 47 and 48 so that actuation of plate 54 simultaneously actuates both shutters 47 and 49.

Trip means T, which also serves as movement-arresting means as hereinafter described, is provided for each berth 19, 24 in each central passage 20, 25. In passages 20, the trip means T for each berth 19 is out of alignment with the trip means T for the other berths 19 and similarly the recess 45 in each support 21 is differently located from the recesses in other supports 21 so that each support 21 is only engaged by its own trip means T and is only taken into its own berth 19.

Figure 4:
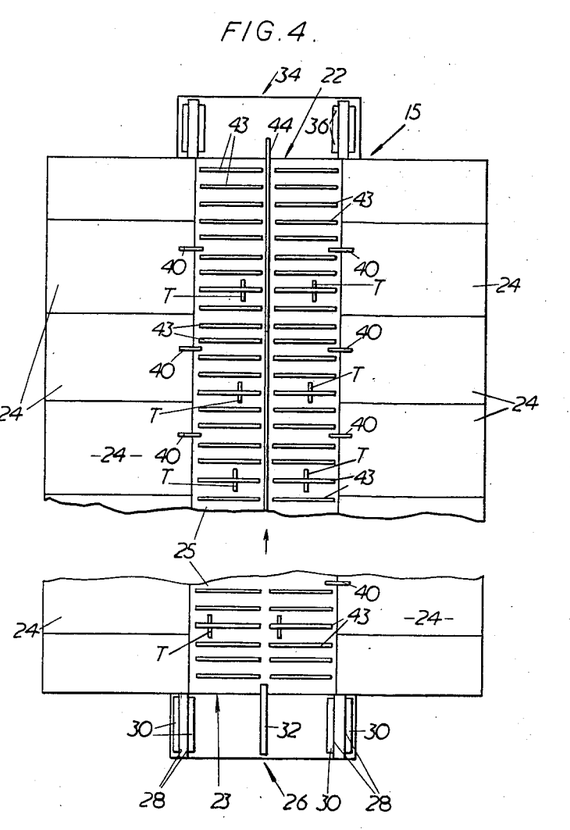
FIG. 4 is a fragmentary plan view of the ground level of the garage.
Figure 5:
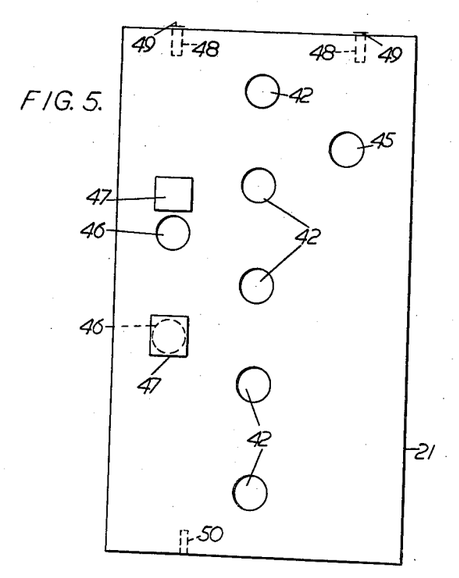
Figure 6:
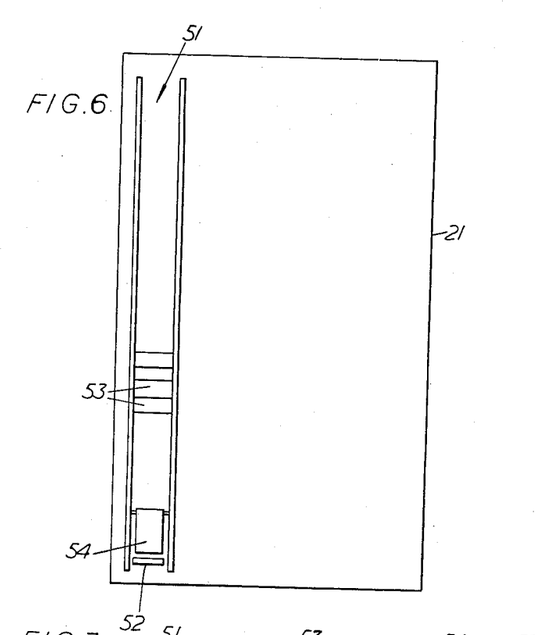
Figures 7, 8C:
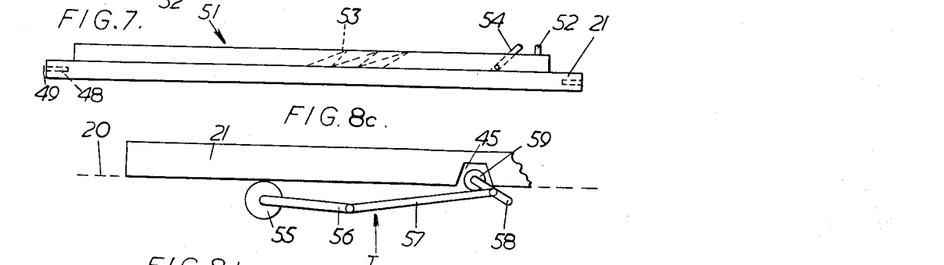

Each support 21 is adapted to be disposed in a berth 24 at one side of the garage when empty and on the opposite side when supporting a motor vehicle and as a result a motor vehicle can be driven forwards into and out of the garage. This disposition of the supports is determined by the recesses 46, only one of which is open at one time, the other being closed by its shutter 47. Two trip means T (see FIG. 4) are provided for each pair of opposed berths 24 and depending on which recess 46 is open the support 21 will be acted upon by the appropriate one of the two trip means T and transferred to the corresponding berth 24 at that side of the floor 15. By arranging the supports 21 at one side of the garage to have a predetermined one of the recesses 46 normally open, and the supports 21 at the other side of the garage to have the other recess 46 normally open, the first supports 21 unloaded are equivalent to the second supports 21 loaded at the ground level 15.

Each trip means T is operatively associated with the chain 44 and its corresponding transfer means (i.e., one of the belts 40 described previously) for example it may form part of an electric circuit which actuates the drives of the chain 44 and transfer means 40, so that when the trip means T is fully operated the movement of the chain 44 is arrested and the transfer means 40 is actuated.

Each of the trip means T (FIGS. 8 to 8d) comprises a wheel or roller 55 which normally projects above the level of the passage 20 or 24 and is carried by a link 56 pivoted to a link 57 which, in turn, is pivotally connected to a small link 58 intermediate its ends. The link 58 carries a small wheel or roller 59 and is spring-loaded so that the roller 59 will always be maintained in contact with a support 21 passing thereover.

When a support 21 passes over the roller 55, the roller is pushed downwards and the link 58 and roller 59 is pushed upwards against the support 21. When the recess 45 (or 46) passes over the roller 59, the latter is urged therein so that as movement of the support 21 continues the trip means is fully operated (FIG. 8d) and movement of the support 21 is arrested either by the trip means T stopping the chain 44 alone or in combination with a suitable bumper bar (not shown).

Each trip means T is operatively associated with its transfer means so that when the trip means T is fully operated, the driving means of the transfer means is actuated and the chain 40 and projections 41 are moved and pull the support 21 into its berth.

Figure 11:
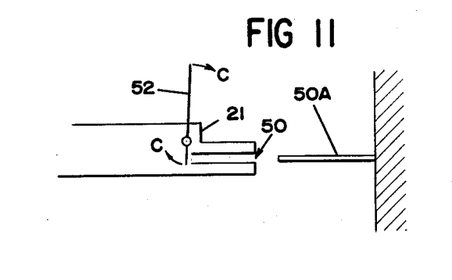
FIG. 11 is a diagrammatic view of actuating means for releasing a vehicle stop plate on a support.

In each berth 24 on ground floor level there is a male part 50A (see FIG. 11) in the form of a stationary rod which, when a support 21 enters a berth 24 at ground level to be unloaded, passes into the female part 50 to contact the lower end of pivoted plate 52 to pivot it in the direction of arrows C, i.e., into a horizontal position, and so allow a motor vehicle on the support 21 to be driven off.

Figure 10:
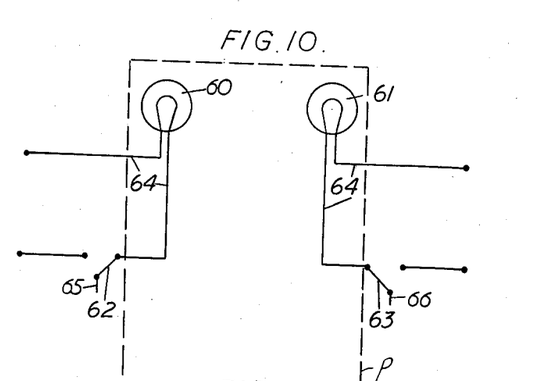
FIGS. 10 to 10b are diagrammatic views of a signalling system.
Figure 10A:
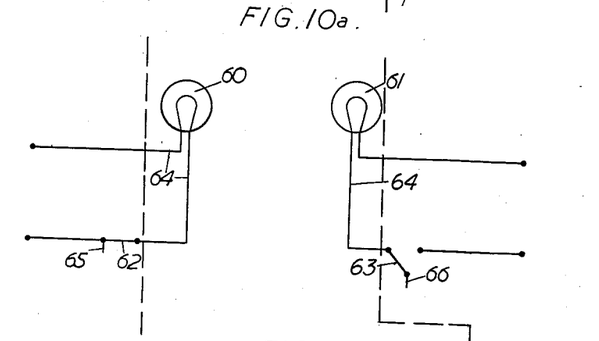
Figure 10B:
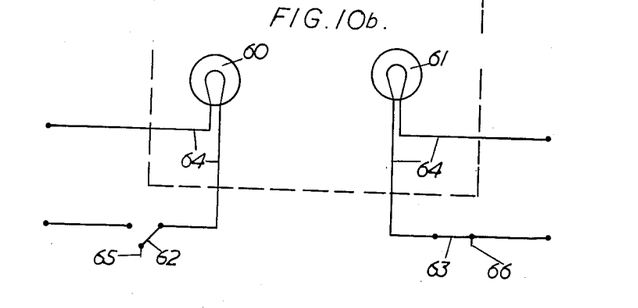

A signalling system may be provided at a suitable control point of the garage and includes a panel P having two differently-coloured signal lamps 60 and 61 for each berth 19. In each berth 19 are two switches 62 and 63 electrically connected to lamps 60 and 61 by leads 64. The switches 62 and 63 each carry a projection 65 and 66 respectively. When the berth 19 is empty, both switches 62 and 63 are open and the lamps are not illuminated. When an empty support 21 is in the berth 19, the switch 62 is closed due to the fact that one of the shutters 49 has closed the appropriate recess 48 and abuts projection 65, whereas switch 63 is open, the projection 66 passing into the other, open recess 48 and the switch 63 thereby remaining open. However if the support 21 carries a motor vehicle the plate 54 will be depressed and the opposite recess 48 will be open so that switch 63 will be closed while switch 62 is open. As a result, an operator can ascertain at any instant the state of each berth 19. In a selection system an operator can therefore bring down any empty or full support 21 he wishes due to the signalling system. In use, supports 21 are disposed as required at each depositing berth 24 so that a support 21 from the first storing floor 16 is nearest the upward conveyor 34 while support 21 from the top storing floor 16 is furthest away therefrom.

Drivers wishing to garage their vehicle drive them into the position on the supports 21. The chain 44 in passage 25 stops at predetermined intervals to permit all loaded supports 21 to be pulled thereon and to be located between two adjacent projections thereon. Each support 21 and its vehicle is then pulled into the central conveying passage 25 by its chain 40 and projections 41 as described above. The chain 44 restarts and the loaded supports 21 are pulled along into the upward conveyor 34. The loaded supports 21 are conveyed upward in turn and when they arrive at their correct storing levels 16 the upward conveyor 34 stops and they are transferred by the appropriate chains 44 to the central conveying passages 20. It will be appreciated that a number of supports each for a different floor, may be on the upward conveyor 34 simultaneously and that as supports are being conveyed upwards, supports can also simultaneously be conveyed downwards on the downwards conveyor 26.

The loaded supports 21 are conveyed along passages 20 by the chains 44 as aforesaid until the appropriate trip means T is operated and the movement of the support is arrested and each is transferred to its berth by the transfer chain 40.

To withdraw motor vehicles from the garage, the selected supports 21, only one for each floor level at the one operation are pulled into the central conveying passages 20 along which they are conveyed to the downward conveyor 26. When the latter stops with the engaging elements 30 in alignment with the floor levels, the loaded supports 21 are urged thereon by chains 44. The loaded supports 21 are conveyed downwards and transferred as hereinbefore described to the central conveying passage 25. The supports are transferred to the central passage chain 44 which is in timed relationship with the downward conveyor 26 and the supports are spaced along the length of the chain 44 between projections similar to 41 in such relative positions that when one support is opposite its correct berth all the other supports are opposite their correct berths. As each support passes over its respective pair of trip means T the trip means corresponding to the open aperture 46 is operated and the transfer chain 40 is brought into operation and the supports are transferred to their unloading berths which are on the opposite side of the garage to that into which they were originally placed for loading. It will be understood that each berth 24 acts as an unloading zone for one set of supports 21 and also as a loading zone for the opposite set of supports 21 from the same storing floor level.

In a modification, the downward conveyor 26 is stopped at each floor level in turn and the supports are loaded in order so that that from the highest floor is loaded first and that from the lowest floor is loaded last. The supports are brought down and conveyed along the central passage 25 in the order in which they were loaded, and are deposited in the berths 24 in order, so that the support from the highest floor is nearest the upward conveyor 34 and the support from the lowest floor is remote therefrom. In this case, the supports 21 are also loaded in the upward conveyor 34 in the same order. Each support reaches its correct floor level simultaneously and the upward conveyor stops. All supports are transferred to the central conveying passages 20 simultaneously and taken to their berths 19 as previously described.

The garaging floors may be directly above the ground floor or spaced well above it, for example the storing levels may be on top of an office building.

The garage may only have one vertical conveyor which serves to raise and lower the supports.

A multi-story garage according to the present invention and as hereinbefore described has the following advantages:

(1) The necessity of providing a multiplicity of uneconomic conventional vertical conveying systems is obviated.

(2) The design and layout of the garage lends itself to a considerable amount of skeleton construction using, for example, lattice type steelwork so that the construction while being strong, stable and of light weight is economic to erect.

(3) Due to the provision of the supports different types of motor vehicles can be handled as identical loads which permits considerable standardisation of equipment and components, simplifies considerably conveying, transfer and selection mechanism and makes possible a comparatively high speed of vehicle turnover.

Various modifications may be made without departing from the scope of the present invention as defined in the accompanying claims.

I claim:

1. A multi-storey garage comprising a loading and unloading zone including two laterally-spaced series of motor vehicle receiving and depositing berths and a central conveying passage, a series of garaging floors vertically spaced above said zone, a pair of laterally-spaced series of side-by-side storing berths in each garaging floor, a removable floor in each storing berth, and means for conveying each removable berth floor and any vehicle supported thereon from its storing berth to said zone, said conveying means including a vertical conveyor disposed at each end of the garage for providing communication between said zone and each garaging floor, one of said vertical conveyors serving to move each removable berth floor and any vehicle supported thereon upwards, while the other serves to move same downwards, transfer means for conveying each removable berth floor and any vehicle supported thereon between the vertical conveyors and central conveying passage said transfer means comprising a short vertical conveyor in alignment and synchronism with the main vertical conveyor and an endless chain carrying support-engaging projections and inclined upwardly from the short conveyor to the main conveyor and means for transferring each removable berth floor and any vehicle supported thereon between the central conveying passage and the storing, receiving and depositing berths, said transfer means comprising transversely-arranged endless chains mounting supporting-engaging projections and the direction of rotation of the chains being reversible.

2. A multi-storey garage comprising a loading and unloading zone including two laterally-spaced series of motor vehicle receiving and depositing berths and a central conveying passage, a series of garaging floors vertically spaced above said zone, a pair of laterally-spaced series of side-by-side storing berths in each garaging floor, a central conveying passage between the laterally-spaced series of storing berths, a removable floor in each storing berth, transfer means for conveying each berth floor and any vehicle supported thereon between the central conveying passage and each storing berth, trip means disposed in each conveying passage and actuable by a berth floor to operate the transfer means to convey the support into its storing berth, and means for conveying each removable berth floor and any vehicle supported thereon from its storing berth to said zone, said conveying means including a vertical conveyor disposed at each end of the garage for providing communication between said zone and each garaging floor, one of said vertical conveyors serving to move each removable berth floor and any vehicle supported thereon upwards, while the other serves to move same downwards, transfer means for conveying each removable berth floor and any vehicle supported thereon between the vertical conveyors and central conveying passage, said transfer means comprising a short vertical conveyor in alignment and synchronism with the main vertical conveyor and an endless chain carrying support-engaging projections and inclined upwardly from the short conveyor to the main conveyor and means for transferring each removable berth floor and any vehicle supported thereon between the central conveying passage and the storing, receiving and depositing berths, said transfer means comprising transversely-arranged endless chains mounting support-engaging projections and the direction of rotation of the chains being reversible.

3. A multi-storey garage comprising a loading and unloading zone, a series of garaging floors vertically spaced above said zone, a pair of laterally-spaced series of side-by-side storing berths in each garaging floor, a removable floor in each storing berth, each floor being formed adjacent one side with a longitudinal channel adapted to receive the wheels at one side of the vehicle, a control panel, means on said control panel for indicating either one of the following two conditions, namely the presence of a floor in its berth without a vehicle supported thereon and the presence of a floor in its berth with a vehicle supported thereon, switch means in each berth and operatively connected to the indicating means, adjustable operating means on each floor for engagement with said switch means to indicate said first mentioned condition, means in said channel of each floor and actuable by means of a vehicle wheel to adjust said operating means so as to indicate said second mentioned condition, and means for conveying each removable berth floor and any vehicle supported thereon between its storing berth to said zone.

4. A multi-storey garage comprising a loading and unloading zone, a series of garaging floors vertically spaced above said zone, a pair of laterally-spaced series of side-by-side storing berths in each garaging floor, a removable floor in each storing berth, each floor being formed adjacent one side with a longitudinal channel adapted to receive the wheels at one side of the vehicle, a control panel, means on said control panel for indicating either one of the following two conditions, namely the presence of a floor in its berth without a vehicle supported thereon, and the presence of a floor in its berth with a vehicle supported thereon, switch means in each berth and operatively connected to the indicating means, adjustable operating means on each floor for engagement with said switch means to indicate said first mentioned condition, means in said channel of each floor and actuable by means of a vehicle wheel to adjust said operating means so as to indicate said second mentioned condition, and means for conveying each removable berth floor and any vehicle supported thereon between its storing berth to said zone, said conveying means including a vertical conveyor disposed at each end of the garage for providing communication between said zone and each garaging floor, one of said vertical conveyors serving to remove each removable berth floor and any vehicle supported thereon upwards, while the other serves to move same downwards.

5. A multi-storey garage comprising a loading and unloading zone, a series of garaging floors vertically spaced above said zone, a pair of laterally-spaced series of side-by-side storing berths in each garaging floor, a removable floor in each storing berth, each floor being formed adjacent one side with a longitudinal channel adapted to receive the wheels at one side of the vehicle, a control panel, means on said control panel for indicating either one of the following two conditions, namely the presence of a floor in its berth without a vehicle supported thereon, and the presence of a floor in its berth with a vehicle supported thereon, switch means in each berth and operatively connected to the indicating means, adjustable operating means on each floor for engagement with said switch means to indicate said first mentioned condition, means in said channel of each floor and actuable by means of a vehicle wheel to adjust said operating means so as to indicate said second mentioned condition, vehicle-securing means arranged on each floor and consisting of spring-loaded securing elements actuable by a vehicle wheel, and means for conveying each removable berth floor and any vehicle supported thereon between its storing berth to said zone.

6. A multi-storey garage comprising a loading and unloading zone, a series of garaging floors vertically spaced above said zone, a pair of laterally spaced series of side-by-side storing berths in each garaging floor, a removable floor in each storing berth, each floor being formed adjacent one side with a longitudinal channel adapted to receive the wheels at one side of the vehicle, a control panel, means on said control panel for indicating either one of the following two conditions, namely the presence of a floor in its berth without a vehicle supported thereon, and the presence of a floor in its berth with a vehicle supported thereon, switch means in each berth and operatively connected to the indicating means, adjustable operating means on each floor for engagement with said switch means to indicate said first mentioned condition, means in said channel of each floor and actuable by means of a vehicle wheel to adjust said operating means so as to indicate said second mentioned condition, vehicle-securing means arranged on each floor and consisting of spring-loaded securing elements actuable by a vehicle wheel, and means for conveying each removable berth floor and any vehicle supported thereon between its storing berth to said zone, said conveying means including a vertical conveyor disposed at each end of the garage for providing communication between said zone and each garaging floor, one of said vertical conveyors serving to remove each removable berth floor and any vehicle supported thereon upwards, while the other serves to move same downwards.

7. A multi-storey garage comprising a loading and unloading zone, a series of garaging floors vertically-spaced above said zone, a pair of laterally-spaced series of side-by-side storing berths in each garaging floor, a central conveying passage between the laterally-spaced series of storing berths, a removable floor for each storing berth, means defining on the undersides of the floors differently-located trip-engaging formations, transfer means for conveying each floor between the central conveying passage and its storing berth, a series of non-aligned, transfer means-operating trip means disposed in each conveying passage, one for each storing berth and its removable floor, each trip means being engageable and actuable by the trip-engaging formation of its floor to operate the transfer means and convey the floor into its berth, a control panel, signal means for each storing berth on said control panel to indicate either one of the two following conditions, namely the presence of a floor in its berth without a motor vehicle supported thereon, and the presence of a floor in its berth with a motor vehicle supported thereon, co-operating means for actuating said signal means and mounted in each storing berth and on its floor, wheel-actuable means on each floor for adjusting the actuating means thereon to cause the signal means to indicate said second-mentioned condition, and means for conveying each removable floor between its storing berth and said zone.

References Cited in the file of this patent

UNITED STATES PATENTS

| | | |
|---|---|---|
| 1,288,567 | Hall | Dec. 24, 1918 |
| 1,394,999 | McKinstry | Oct. 25, 1921 |
| 1,486,275 | Becker | Mar. 11, 1924 |
| 1,775,799 | Young | Sept. 16, 1930 |
| 1,931,402 | Black | Oct. 17, 1933 |
| 2,077,238 | Henricks | Apr. 13, 1937 |
| 2,569,393 | Walker | Sept. 25, 1951 |
| 2,598,750 | Bargehr | June 3, 1952 |
| 2,667,983 | Billings | Feb. 2, 1954 |
| 2,722,322 | Gunderson | Nov. 1, 1955 |
| 2,745,561 | Natkanski | May 15, 1956 |

FOREIGN PATENTS

| | | |
|---|---|---|
| 792,864 | Great Britain | Apr. 2, 1958 |

OTHER REFERENCES

Architectual Forum, pub. of February 1953, pp. 136–139; copy in 20–1.13.